United States Patent [19]
Cummings et al.

[11] Patent Number: 5,381,833
[45] Date of Patent: Jan. 17, 1995

[54] INSULATED PIPE ASSEMBLY AND PIPE SUPPORT THEREFOR

[76] Inventors: Richard Cummings, 626 Marshall Rd., Coldwater, Mich. 49036; Lee J. Gee, 1178 Carter Rd.; John Warren, 610 Hampden, both of Midland, Mich. 48640

[21] Appl. No.: 152,909

[22] Filed: Nov. 12, 1993

Related U.S. Application Data

[63] Continuation of Ser. No. 843,448, Mar. 18, 1992, abandoned.

[51] Int. Cl.$^6$ .............................................. F16L 3/00
[52] U.S. Cl. ..................................... 138/107; 138/149
[58] Field of Search ............... 138/108, 113, 106, 107, 138/148, 149

[56] References Cited

U.S. PATENT DOCUMENTS

| | | | |
|---|---|---|---|
| 1,500,306 | 7/1924 | Forward et al. | 138/108 |
| 2,126,785 | 8/1938 | Laddon | 138/113 |
| 2,181,664 | 11/1939 | Melzer | 138/108 |
| 3,098,509 | 7/1963 | Bagnall | 138/108 |
| 3,714,750 | 2/1973 | Pallotto | 138/113 |
| 3,916,081 | 10/1975 | Floessel et al. | 138/113 |
| 3,928,714 | 12/1975 | Matchett | 138/108 |
| 4,146,203 | 3/1979 | Williams | 138/107 |
| 4,424,027 | 1/1984 | Suey | 138/149 |
| 4,765,577 | 8/1988 | Collins et al. | 138/107 |
| 4,852,831 | 8/1989 | Sandstrom | 138/149 |
| 4,925,622 | 5/1990 | Gray, III et al. | 138/149 |
| 5,078,346 | 1/1992 | Deichman . | |

FOREIGN PATENT DOCUMENTS

| | | | |
|---|---|---|---|
| 830275 | 7/1949 | Germany . | |
| 1127158 | 4/1962 | Germany | 138/108 |

Primary Examiner—David A. Scherbel
Assistant Examiner—James F. Hook
Attorney, Agent, or Firm—McCaleb, Lucas & Brugman

[57] ABSTRACT

This invention is a pipe support for a pipe covered by a cylindrical bat of insulation. The insulated pipe is suspended by a pipe hanger having a clevis extending round and beneath the pipe. The pipe support comprises an upwardly concave saddle engageable with the underside of the pipe within the insulation. A pipe support base is secured to the clevis and comprises a bracket fixedly secured to the clevis by a lock bolt; alternatively, a portion of the clevis may serve as the pipe support base. Top and bottom ends of a vertical connector are secured respectively to the saddle and to the support base. A vertical connector extends through the insulation at the bottom of the pipe. The ends of the connector are fixedly secured respectively to the saddle and to the support base. In one embodiment, the connector is a single shaft or rod. In another embodiment, the connector is a rod removably telescopically assembled within a hollow sleeve. The connector transmits the weight load of the pipe directly from the saddle to the clevis, independently of the insulation. The concave configuration of the saddle holds the pipe against lateral misalignment; the fixed securement of the connector to the pipe support base maintains them in vertical alignment; and a snug fit between the telescopically assembled rod and sleeve, where used, prevents lateral misalignment.

6 Claims, 6 Drawing Sheets

INSULATED PIPE ASSEMBLY AND PIPE SUPPORT THEREFOR

This is a continuation of copending application Ser. No. 07/843,448 filed on Mar. 18, 1992, now abandoned.

BACKGROUND OF THE INVENTION

The field of this invention is piping, particularly which is insulated to minimize loss of heat where the pipe conveys hot fluids, and to minimize warm-up and condensation where the pipe conveys cold fluids, and allow drainage should any condensation occur. Typically, insulation for such piping is provided in bats, about three feet long and is suspended on pipe hangers 10 to 15 ft. apart depending on the load. Individual bats are provided in matching, semi-cylindrical sections hinged together by a flexible strip. At the opposite side, the sections are held together by adhesive flaps which hold the halves together on the pipe.

The best insulation, from the standpoints of cost, shipping expense and ease of installation, is very light weight, consisting of a low heat conductive mineral or fiberglass matrix, with a high volume percentage of entrapped air. It is somewhat brittle, and definitely is not load-bearing material. It will not carry a pipe load. Any attempt to do so would compress and damage the insulation rendering it ineffective.

Figures 14, 15:
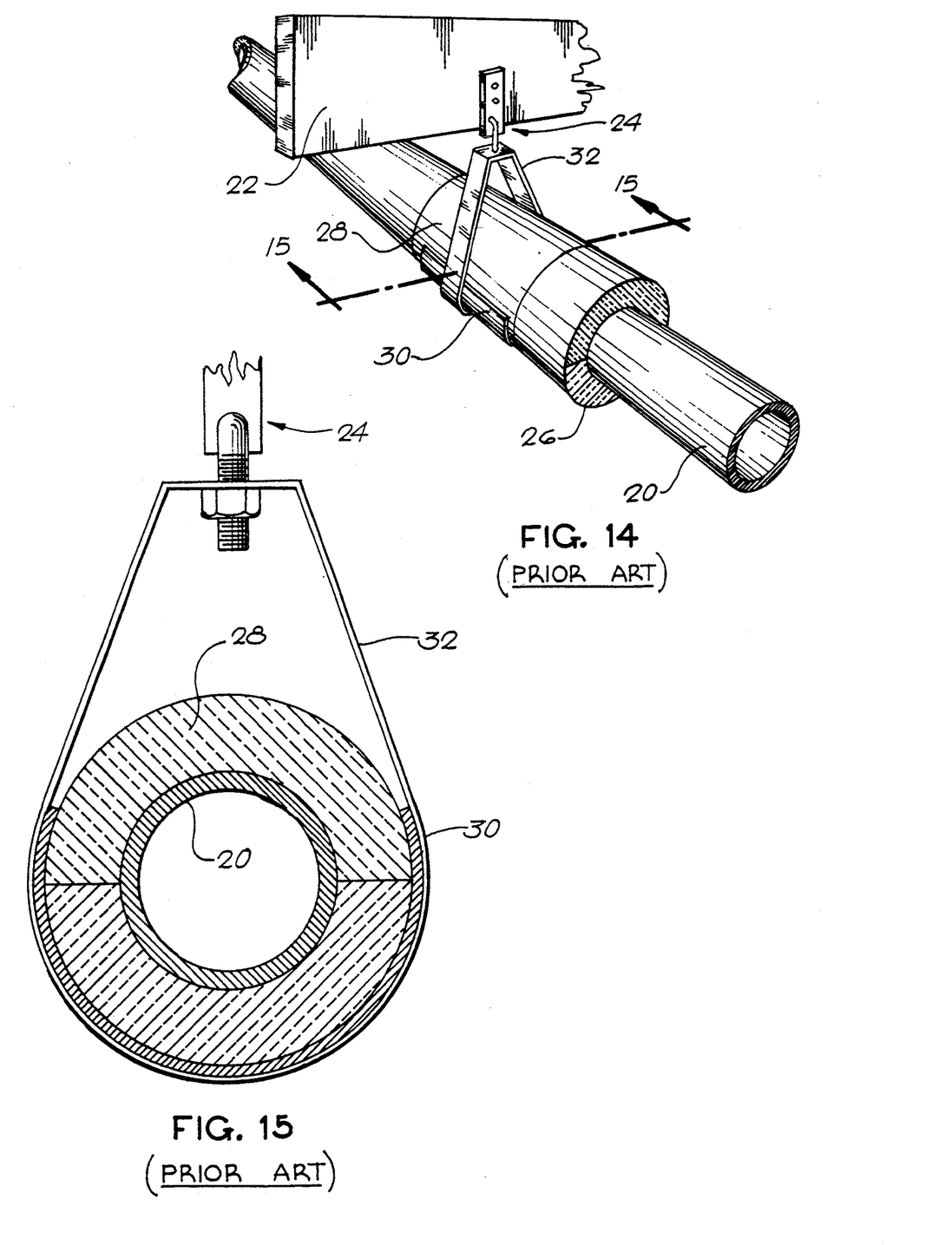
FIG. 14 is a perspective view of an insulated pipe assembly illustrating a prior art arrangement.
FIG. 15 is an enlarged cross-sectional view of FIG. 14, taken along line 15—15.

To avoid this problem, the prior art utilizes at each load hanger a special, hard, dense insulation bat capable of carrying heavy loads. This is illustrated in FIGS. 14 and 15 where a pipe 20 is supported from bars or joists 22 by hangers 24. Between hangers, where there is no load-bearing problem, the pipe is fitted with the typical light weight insulation 26. At each hanger, a bat 28 of hard, load-bearing insulation is substituted and inserted between the lengths of soft insulation 26. A metal saddle 30 is provided under the hard insulation, to spread the load, and in turn is supported by a clevis 32. All the joints between the hard and soft insulation sections must be vapor sealed. This is expensive, cumbersome, and time-consuming.

SUMMARY OF THE INVENTION

The general purpose of this invention is to provide an insulated pipe assembly in which the weight load of the pipe is transferred directly to a pipe hanger clevis independently of the surrounding insulation, so ordinary, non-load-bearing insulation bats may be employed for the entire length of the pipe.

A general object of the invention is to provide in a clevis-suspended insulated pipe assembly, an improved support comprising a pipe-support base on the clevis below the pipe assembly, an upwardly concave saddle engaging the underside of the pipe within the insulation, and connecting means extending through the insulation and connecting the pipe support base to the saddle enabling the clevis to support the pipe independently of the insulation.

Another object is to provide in such an insulated pipe assembly, connecting means comprising telescopically interengaged pin and sleeve means.

Another object is to provide in such an insulated pipe assembly a hollow sleeve secured either to the saddle member or the clevis member and a pin secured to the other member and telescopically journaled within the sleeve to stabilize the pin and sleeve assembly against lateral shifting relative to both the saddle and the clevis.

Another object is to provide in such an insulated pipe assembly, a bracket slidably engageable onto the clevis and lockable into a predetermined location beneath the pipe, and a portion of telescopically engaged pin and sleeve means connected to the bracket and extending upwardly to the saddle.

Another object is to provide in such an insulated pipe assembly a saddle which has a pair of upwardly diverging, angularly disposed arms for tangential engagement with the undersides of pipes of different radiuses.

BRIEF DESCRIPTION OF THE DRAWINGS

Other objects and advantages will be apparent from the following description taken in connection with the drawings in which.

Like parts are designated by like reference numerals throughout the figures.

DESCRIPTION OF THE PREFERRED EMBODIMENTS

Referring now to the embodiment shown in FIGS. 1–9, an insulated pipe assembly 40 including a pipe 42 may convey hot or cold fluid. It is encased by cylindrical bats of insulation 44 and supported typically at ten to fifteen foot spacings by pipe hanger assemblies 46, 46.

Figure 1:
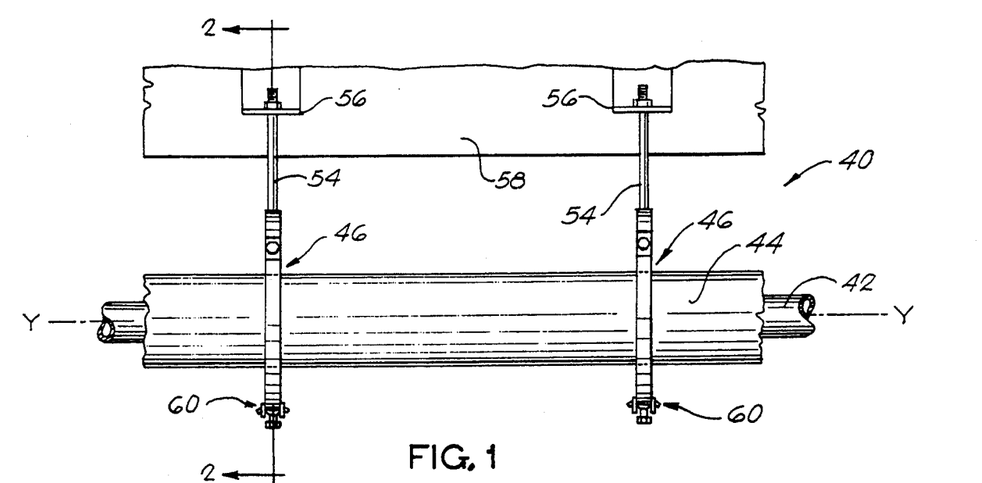
FIG. 1 is a side elevational view of an insulated pipe assembly and pipe support therefor illustrating a preferred form of the present invention.
Figure 2:
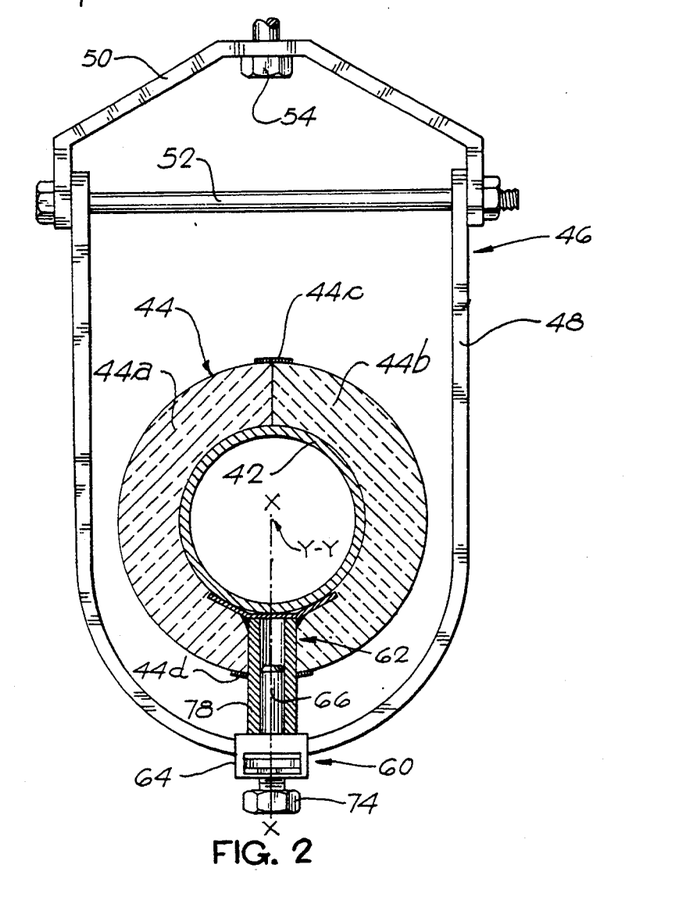
FIG. 2 is an enlarged cross-sectional view of FIG. 1 taken along line 2—2.
Figure 9:
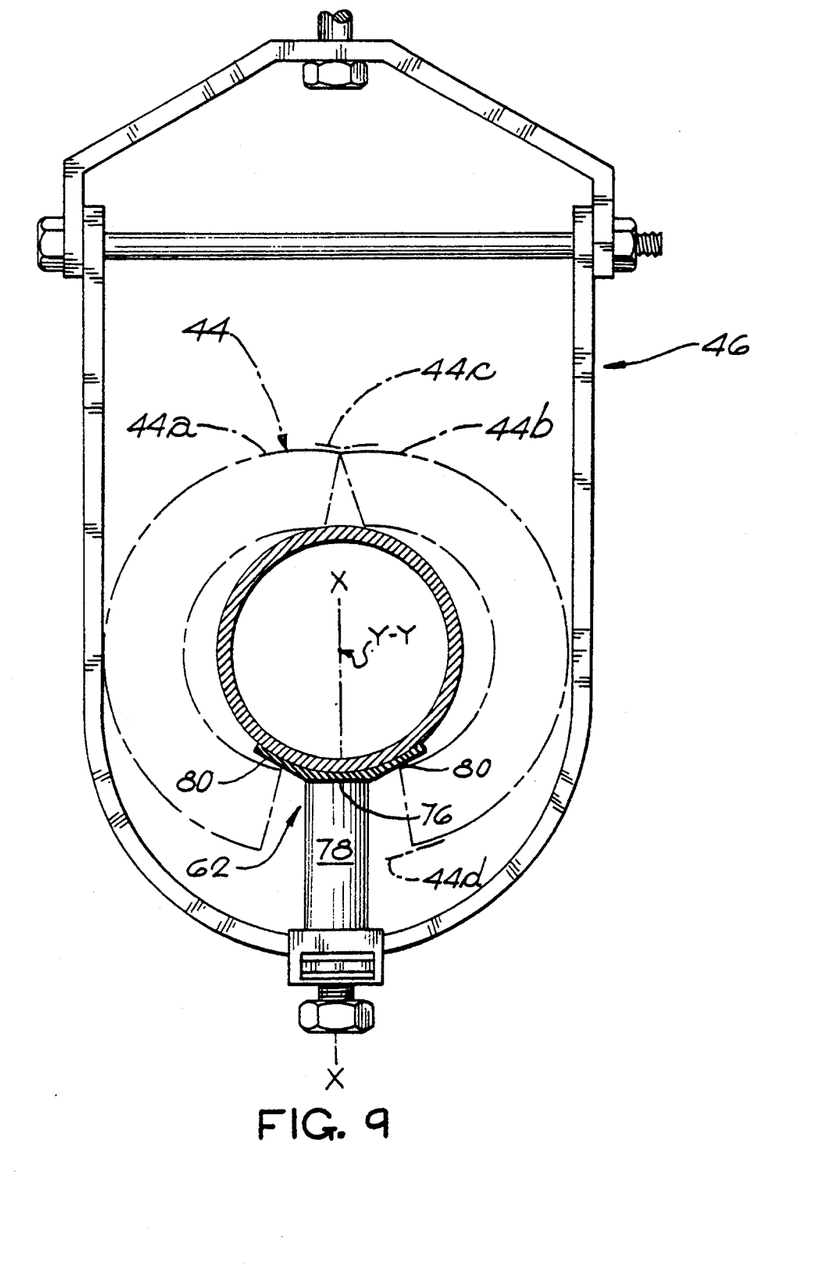
FIG. 9 is a view similar to FIG. 2 illustrating the step of fitting a bat of insulation over a previously-installed pipe assembly.

Typically the bats 44 comprise matched semi-cylindrical halves 44a and 44b which are connected by a flexible paper or plastic hinge 44c and have a pressure-adhesive closure tab 44d (FIGS. 2 and 9). Bats may be about three feet long and vapor-sealed at the joints with adhesive tape (not shown). The insulation material is a low density, low heat conductive mineral or fiberglass matrix with a high proportion of entrapped air.

Referring to FIGS. 1–6, each pipe hanger assembly 46 comprises a lower pipe hanger clevis 48 and an upper pipe hanger yoke 50 joined by a cross bolt 52 and suspended by a level-adjusting bolt 54 from a bracket 56 secured to a bar or joist 58. A pipe support base assembly 60 and pipe saddle assembly 62 enable the clevis 48 to support the pipe 42 directly, independently of the insulation 44 as will now be described.

The pipe support base assembly 60 is best shown in FIGS. 2–6 and comprises a clamp 64 with an upstanding pin 66. The pipe support base assembly is not limited to any particular form and may be fabricated of a wide variety of metal or plastic materials. In the present example the material is steel. The clamp comprises an inverted U-shaped plate 68 having a horizontal body 68A and vertical flanges 68B with horizontal slots 68C. This encloses the hanger clevis 48 as best shown in cross-section in FIG. 4. A lock plate 70 has downwardly inclined end portions 70A engaged within slots 68C and has a depressed, apertured central portion with a weld nut 72 threadedly engaging a lock bolt or screw 74. In use, the pipe support base assembly 60 is centrally located at the bottom of the clevis 48 and locked in place by the lock bolt 74.

The pipe saddle assembly 62 comprises an upwardly concave saddle 76 with a downwardly extending hollow cylindrical sleeve or stem 78. As best shown in FIG. 2, the saddle assembly 62 is assembled with the sleeve 78 telescopically fitted over the pin 66. The bottom end of the sleeve 78 is in thrust bearing relationship with the top of the clamp 64. The sliding fit between the parts is snug, preventing relative lateral movement between the saddle assembly 62 and the base clamp assembly 64. The bottom end of the sleeve 78 is in thrust bearing relationship with the top surface of the clamp 68. That is, the weight of the pipe 42, bearing downwardly through the sleeve 78, applies a downward end thrust from the bottom end of the sleeve to the horizontal top surface 68A of the clamp.

The saddle 76 is a bent plate, comprising a pair of upwardly diverging straight, angularly disposed arm sections 80 and a central section 82. The angular sections 80 will tangentially engage a pipe 42 of the radius shown in FIGS. 2 and 9, as well as a plurality of other pipes of larger radii. In this respect, the angular configuration of saddle 76 minimizes stocking requirements because it will fit several different pipe sizes and hold each stably against lateral displacement.

Figure 8:
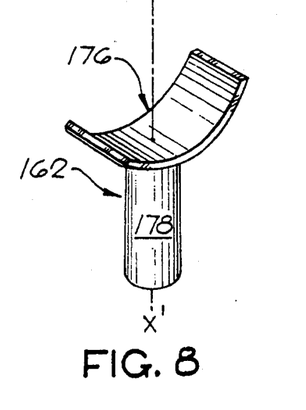
FIG. 8 is a view similar to FIG. 7 showing an alternative saddle assembly.

FIG. 8 shows an alternative saddle assembly 162 in which a curved cylindrical saddle 176 is secured to the upper end of a hollow sleeve 178. The radius of saddle 176 will match the radius of the pipe supported by it.

Thus, an important feature of the invention is the stable support, holding the pipe 42 precisely centered within the clevis 48, without any possibility of lateral displacement yet enabling ready disassembly when necessary, and free thermal expansion and contraction. The upwardly concave configuration of the saddle cradles the pipe against lateral movement. The telescopical snug fit between the sleeve and pin prevents lateral displacement. And the lock bolt secures the pipe support base against lateral movement relative to the hanger clevis.

In use, an insulated pipeline will be hung in two steps: first, the pipe will be installed, leveled, and tested for leaks; second, with the pipe in place, the insulation bats will be applied.

There are two methods of hanging pipe. For smaller pipes, the hanger assemblies 46 are installed, typically every ten to fifteen feet along a run, and then the pipe 42 is threaded through the hanger assemblies. With larger pipes, they are temporarily held by chain hoists, then the hanger assemblies are fitted around them at which time the chains can be removed.

With small pipes, the pipe support base assemblies 60 are installed and fixed by lock bolts 74 prior to the pipe hanger assemblies 46 being installed and hung from adjustment bolts 54. The pipe 42 is then installed through the hangers, being cradled on the saddle assemblies 62. The pipe is then leveled by adjustment bolts 54 and will be pressure tested, after which the line will be released to the insulation installer.

At this stage, the pipe will be as shown in solid lines in FIG. 9, without insulation. The insulation bats 44 will be opened and fitted around the pipe, clamshell fashion, and held assembled by longitudinal adhesive tabs 44d. Tapes (not shown) will be applied circumferentially about the abutting joints between bats.

Figures 3, 7:
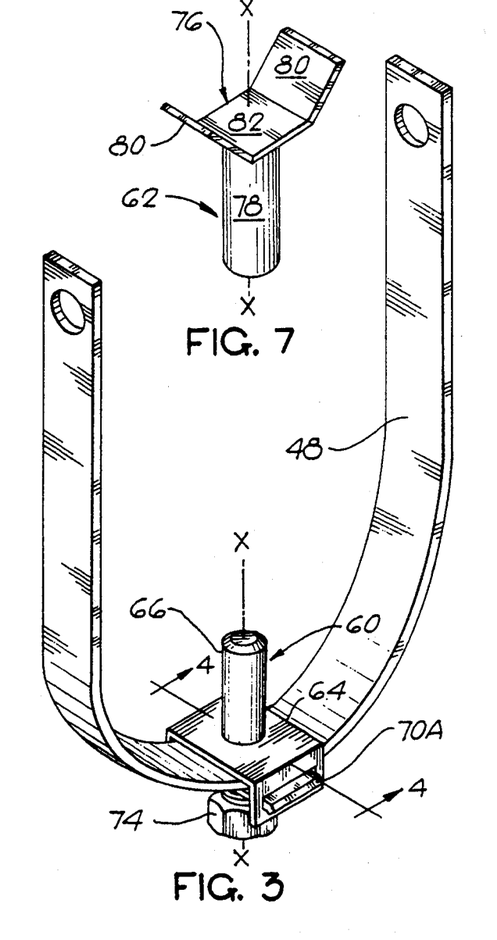
FIG. 3 is a fragmentary, perspective view of FIG. 2.
FIG. 7 is a separate perspective view of the saddle assembly shown in FIG. 2.
Figure 4:
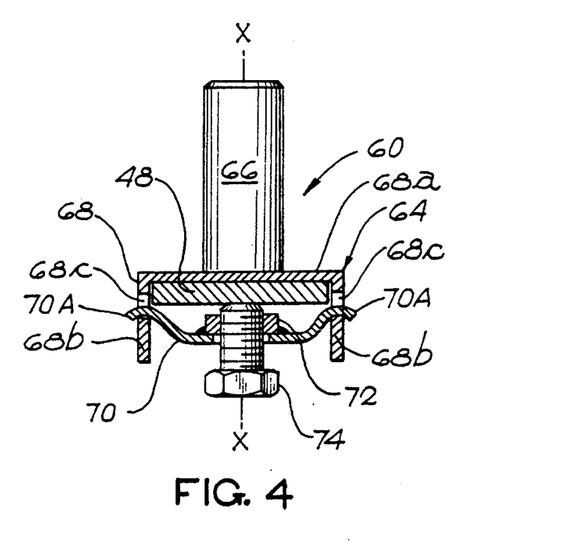
FIG. 4 is an enlarged cross-sectional view of FIG. 3 taken along line 4—4.
Figure 5:
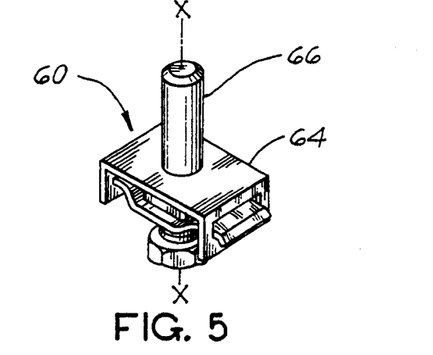
FIGS. 5 and 6 are separate, perspective views of the pipe support base bracket shown in FIG. 3.
Figure 6:
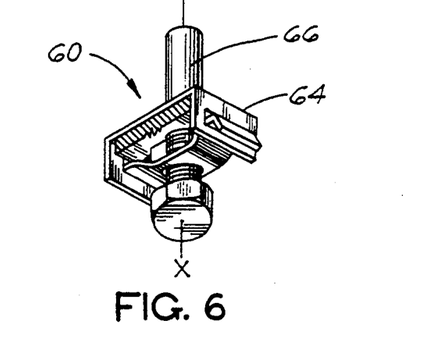

As described above, the pipe assembly will be supported typically at ten to fifteen foot spacings by pipe hanger assemblies 46, 46. As shown assembled in FIGS. 1 and 2, the vertical edges of the semi-cylindrical insulation bats may abut one another (as shown for the top edges in FIG. 2) except at ten to fifteen foot spacings where the hanger assemblies are located. At these locations, as shown in FIG. 2, the lower, abutting edges of the insulation bats may readily be carved out to accommodate the sleeves 78, because the insulation material is relatively frangible and easily carved by simple tools, or even the operator's fingers.

Where there is a pipe hanger assembly 46, the bat will be slid around the pipe and saddle assembly 62 as shown in broken lines in FIG. 3. When it is closed, clamshell fashion, the insulation compresses at the saddle assembly 62 allowing the tabs 44d to close sections 44a, 44b as shown in FIG. 2.

Figure 10:
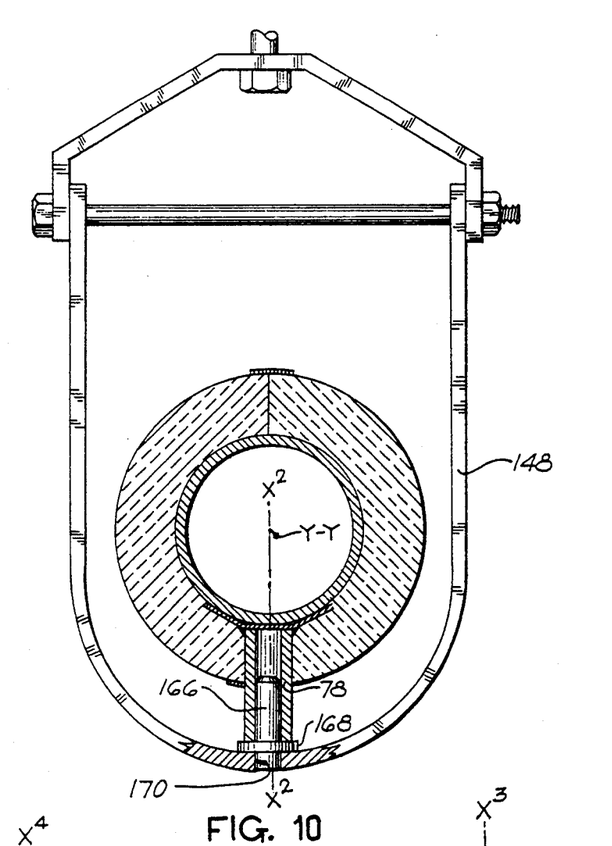
FIG. 10 is a view similar to FIG. 2 showing an alternative form of the invention.

FIG. 10 shows an alternative embodiment. This is similar to FIG. 2 except that the pin 166 is a permanent, integral part of the clevis 148. The pipe support base assembly comprises a washer or collar 168 on the clevis at the bottom of pin 166, and the bottom end of the sleeve 78 is in thrust bearing relationship with it. That is, the weight of the pipe 42, bearing downwardly through the sleeve 78, applies a downward end thrust from the bottom end of the sleeve directly onto the collar 168 carried by the clevis. The lower end portion of pin 166 is more or less permanently secured in a bore 170 in clevis 148 as by welding, brazing, or simply a press fit.

Figure 11:
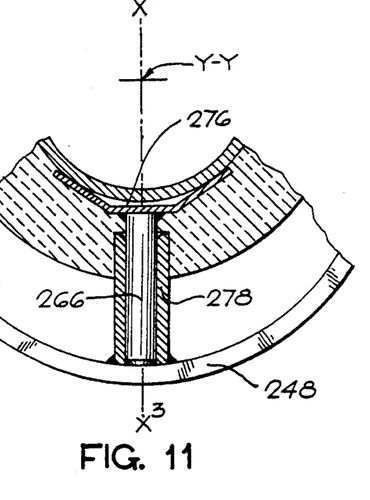
FIG. 11 is a fragmentary view similar to FIG. 10 showing a further alternative form of the invention.

The embodiment shown in FIG. 11 is the reverse of FIG. 10. A pin 266 is secured to the bottom of saddle 276 and is telescopically fitted within cylindrical sleeve 278 secured as by welding to the clevis 248. The bottom end of pin 266 is in direct, thrust-bearing relationship with the clevis 248. That is, the weight of the pipe is carried through the pin 266 and applies an end load directly to the upper surface of the clevis 248. In the embodiment shown in FIG. 12, the clevis 348 and saddle 376 are integral, being secured a fixed distance apart by a pin 366 by means of welding shown respectively at 368 and 370. The bottom end of pin 366 is in direct, thrust-bearing relationship with the clevis 348. That is, the weight of the pipe is carried through the pin 366 directly into the clevis.

Figure 13:
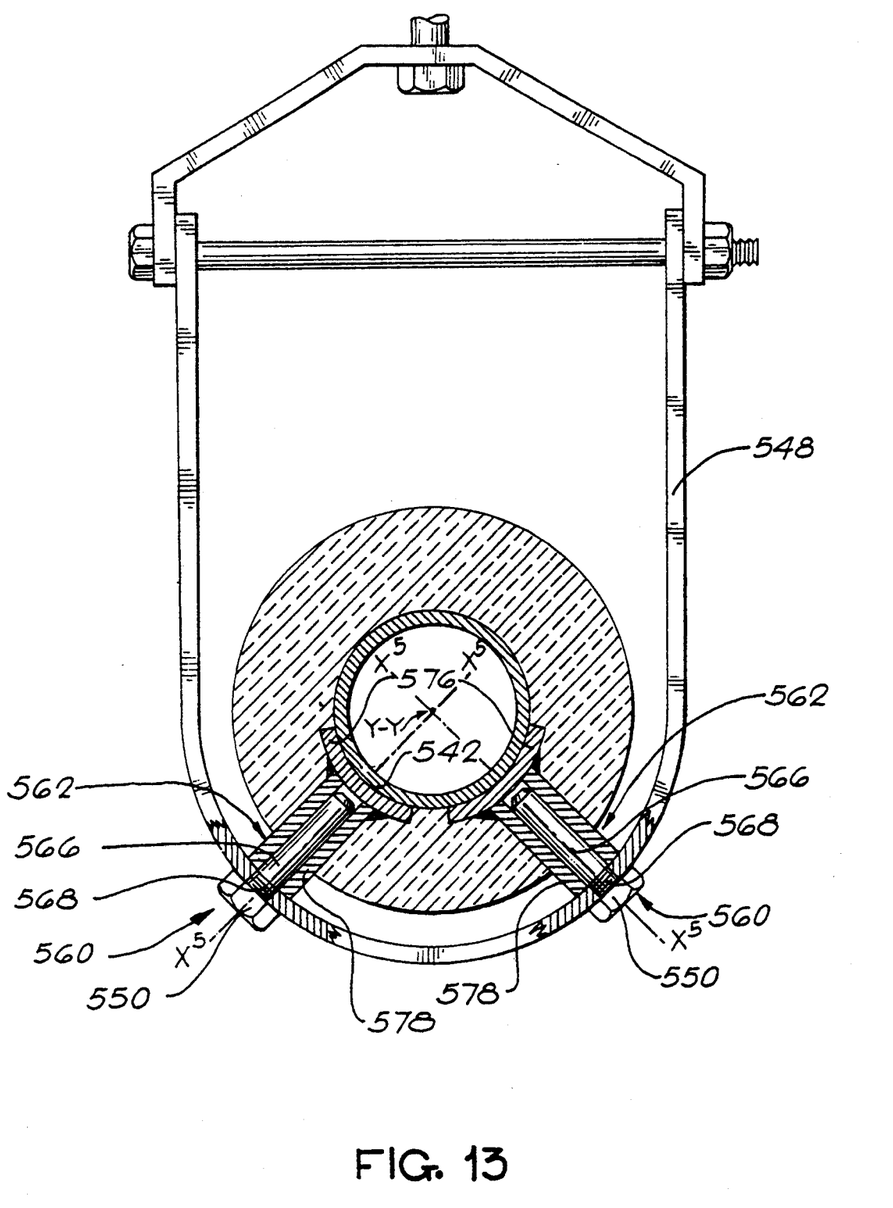
FIG. 13 is a view similar to FIG. 2 showing an alternative heavy-duty embodiment utilizing a pair of pipe supports according to the present invention.

In FIG. 13, a heavy duty version for largediameter pipe is shown. This is similar to the embodiment shown in FIGS. 2 and 10 except that two saddle assemblies 562 with corresponding pipe support base assemblies 560 are supported on the pipe hanger clevis 548.

More particularly, referring to FIG. 13, each saddle assembly 562 comprises a saddle 576 to match the radius of pipe 542. A hollow sleeve 578 is secured to the underside of the corresponding saddle 576 and is telescopically engaged with a corresponding pin 566 having a lower screw-threaded section 568 threadedly secured to the clevis 548. Assembly and disassembly is effected by hex heads 550 on the lower ends of pins 566, 566.

In all embodiments, there is an elongated connecting means extending along a radial axis that is radial to the horizontal axis Y—Y of the pipe 42.

In FIGS. 2 and 9, the telescopically assembled pin 66 and hollow sleeve 78 extend along a radial axis X—X which is radial to, and intersects, pipe axis Y—Y.

The alternative saddle assembly 162 shown in FIG. 8 may be used in place of the saddle assembly 62 in FIGS. 2 and 3. When so used, the telescopically assembled pin 66 and hollow sleeve 178 extend respectively along radial axes X—X and X'—X' which would be congruent in such embodiment.

In FIG. 10, the telescopically assembled pin 166 and sleeve 78 extend along a radial axis $X^2$—$X^2$ which is radial to, and intersects, pipe axis Y—Y.

In FIG. 11, the telescopically assembled pin 266 and sleeve 278 extend along a radial axis $X^3$—$X^3$ which is radial to, and intersects, pipe axis Y—Y.

Figure 12:
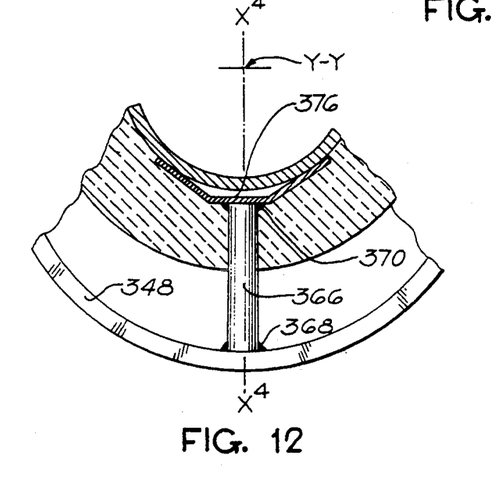
FIG. 12 is a view similar to FIG. 11 showing a still further alternative form of the invention.

In FIG. 12, the pin 366 extends along a radial axis $X^4$—$X^4$ which is radial to, and intersects, pipe axis Y—Y.

While particular examples of the present invention have been shown and described, it is apparent that changes and modifications may be made therein without departing from the invention in its broadest aspects. The aim of the appended claims, therefore, is to cover all such changes and modifications included within the spirit and scope of the invention.

Having thus described our invention, what is claimed is:

1. In an insulated pipe assembly including a cylindrical pipe extending along a generally horizontal pipe axis with a cylindrical bat of insulation encasing the outside of the pipe and a pipe hanger comprising a clevis member suspended from an overhead support and extending beneath the insulated pipe assembly, an improved pipe support comprising:

an rigid saddle member laterally and axially embracing and engaging the underside of the pipe between the latter and the insulation so that the pipe is laterally restrained by, but axially moveable relative to said saddle member;

elongated rigid connecting means for transferring weight load directly from the pipe to the clevis member whereby to isolate said load from the insulation;

said connecting means extending downwardly through the insulation from the saddle member along an axis that radially intersects said horizontal pipe axis and having opposite upper and lower radial ends which are located, respectively, radially inwardly and outwardly of said bat of insulation;

means for fixedly securing the upper radial end of the connector means to the saddle member to prevent displacement of the connecting means relative to the saddle member in any direction; and means for positively securing the lower radial end of the connecting means to the clevis member to prevent displacement of the connecting means relative to the clevis member in any direction.

2. In an insulated pipe assembly, an improved pipe support according to claim 1 in which the connecting means is a pin and sleeve assembly comprising a hollow cylindrical sleeve and a coaxially mating pin slidably journaled within the sleeve to stabilize the pin and sleeve assembly against lateral movement relative to both the saddle member and the clevis member, means securing the sleeve to one of said members, and means securing the pin to the other of said members.

3. In an insulated pipe assembly, an improved pipe support according to claim 2 in which said pin is connected to and extends vertically upwardly from the clevis member, and said hollow sleeve is fixed to and extends vertically downwardly from the saddle member.

4. In an insulated pipe assembly, an improved pipe support according to claim 2 in which said hollow sleeve is connected to and extends vertically upwardly from the clevis member, and said pin is fixed to and extends vertically downwardly from the saddle member.

5. In an insulated pipe assembly, an improved pipe support according to claim 1 in which said means for securing the lower radial end of the connecting means to the clevis member comprises adjustable clamp means fixed to said lower end of said connecting means and detachably secured to the clevis member.

6. In an insulated pipe assembly, an improved pipe support according to claim 1 in which said elongated connecting means comprises an elongated vertical member with upper and lower ends fixedly secured to central portions of the bottom side of the saddle member and the top side of the clevis member, respectively.

* * * * *

UNITED STATES PATENT AND TRADEMARK OFFICE
CERTIFICATE OF CORRECTION

PATENT NO. : 5,381,833
DATED : January 17, 1995
INVENTOR(S) : Richard Cummings, Lee J. Gee & John Warren It is certified that error appears in the above-indentified patent and that said Letters Patent is hereby corrected as shown below:

Col. 1, line 6, delete "07,843,448" and insert -- 07/853,448;

Col. 2, line 58-59, delete "press-ureadhesive" and insert -- pressure-adhesive --;

Col. 4, line 54, after "248." a new paragraph should start;

Col. 4, line 62, delete "largediameter" and insert -- large-diameter --;

Col. 5, line 45, delete "an" and insert -- a --.

Signed and Sealed this

Eighteenth Day of July, 1995

*Attest:*

BRUCE LEHMAN

*Attesting Officer*    *Commissioner of Patents and Trademarks*